United States Patent
Capuozzo et al.

(10) Patent No.: US 10,089,106 B2
(45) Date of Patent: Oct. 2, 2018

(54) COMMUNICATIONS NETWORK, COMPUTER ARCHITECTURE, COMPUTER-IMPLEMENTED METHOD AND COMPUTER PROGRAM PRODUCT FOR DEVELOPMENT AND MANAGEMENT OF FEMTOCELL-BASED APPLICATIONS

(71) Applicant: Accenture Global Services Limited, Dublin (IE)

(72) Inventors: Giuseppe Capuozzo, Rome (IT); Orlando Onorato, Rome (IT); Alessandro Imparato, Rome (IT); Daniele D'Errico, Rome (IT); Gianluca D'Angelo, Casalnuovo di Napoli (IT)

(73) Assignee: Accenture Global Services Limited, Dublin (IE)

( * ) Notice: Subject to any disclaimer, the term of this patent is extended or adjusted under 35 U.S.C. 154(b) by 68 days.

(21) Appl. No.: 15/204,344

(22) Filed: Jul. 7, 2016

(65) Prior Publication Data

US 2016/0321065 A1 Nov. 3, 2016

Related U.S. Application Data

(63) Continuation of application No. 13/800,457, filed on Mar. 13, 2013, now Pat. No. 9,417,849.

(30) Foreign Application Priority Data

Nov. 30, 2012 (EP) .................................... 12425191

(51) Int. Cl.
*G06F 9/44* (2018.01)
*H04W 4/00* (2018.01)
(Continued)

(52) U.S. Cl.
CPC .................. *G06F 8/70* (2013.01); *G06F 8/00* (2013.01); *G06F 8/20* (2013.01); *G06F 8/30* (2013.01);
(Continued)

(58) Field of Classification Search
CPC .......... G06F 11/3668; G06F 8/00; G06F 8/20; G06F 8/30; G06F 8/70; G06F 8/36; G06F 9/465; G06F 9/54
See application file for complete search history.

(56) References Cited

U.S. PATENT DOCUMENTS 7,080,351 B1 *  7/2006  Kirkpatrick ............ G06Q 10/06
                                                    717/102
7,167,865 B1     1/2007  Tharp
(Continued)

FOREIGN PATENT DOCUMENTS

WO   WO 2012/018824   2/2012

OTHER PUBLICATIONS

Jay Weitzen et al.; Comparing Coverage Quality for Femtocell and Macrocell Broadband Data Services; 2010 IEEE; pp. 40-44; < https://ieeexplore.ieee.org/stamp/stamp.jsp?tp=&arnumber=5394028>.*

(Continued)

*Primary Examiner* — Thuy Dao
*Assistant Examiner* — Cuong V Luu
(74) *Attorney, Agent, or Firm* — Brinks Gilson & Lione

(57) ABSTRACT

In one aspect, the present application is directed to a communications network, a computer architecture, a computer-implemented method, and a computer program product for development and management of femtocell-based applications. In one aspect, the communications network may comprise at least one femtocell; a mobile operator network; and a computer architecture integrated in the (Continued)

mobile operator network, wherein the computer architecture is operable to support development and lifecycle management of at least one femtocell-based application for the at least one femtocell.

9 Claims, 7 Drawing Sheets

(51) Int. Cl.
| | |
|---|---|
| *H04M 3/42* | (2006.01) |
| *H04B 17/00* | (2015.01) |
| *G06F 8/70* | (2018.01) |
| *G06F 8/20* | (2018.01) |
| *G06F 8/00* | (2018.01) |
| *G06F 8/30* | (2018.01) |
| *G06F 11/36* | (2006.01) |
| *H04W 24/06* | (2009.01) |
| *H04W 4/60* | (2018.01) |
| *H04M 1/725* | (2006.01) |

(52) U.S. Cl.
CPC .......... *G06F 11/3668* (2013.01); *H04W 4/60* (2018.02); *H04W 24/06* (2013.01); *H04M 1/72525* (2013.01); *H04M 2201/42* (2013.01)

(56) References Cited

U.S. PATENT DOCUMENTS

| | | | | |
|---|---|---|---|---|
| 7,339,891 | B2* | 3/2008 | Binder | H04L 43/50 370/231 |
| 8,213,935 | B2 | 7/2012 | Jones et al. | |
| 8,301,178 | B1 | 10/2012 | Breau | |
| 2002/0052895 | A1 | 5/2002 | Keating | |
| 2003/0156549 | A1* | 8/2003 | Binder | H04L 43/50 370/252 |
| 2006/0190922 | A1* | 8/2006 | Chen | G06Q 10/06 717/100 |
| 2007/0220479 | A1 | 9/2007 | Hughes | |
| 2007/0271598 | A1 | 11/2007 | Chen | |
| 2008/0127135 | A1 | 5/2008 | Bergstrom et al. | |
| 2009/0019420 | A1 | 1/2009 | Johnson | |
| 2009/0187690 | A1 | 7/2009 | Smart | |
| 2009/0192849 | A1 | 7/2009 | Hughes et al. | |
| 2009/0257416 | A1 | 10/2009 | Walker et al. | |
| 2009/0298472 | A1 | 12/2009 | Nagano | |
| 2009/0313004 | A1 | 12/2009 | Levi | |
| 2010/0015948 | A1 | 1/2010 | Nagano | |
| 2010/0167734 | A1 | 7/2010 | Jones et al. | |
| 2010/0177722 | A1* | 7/2010 | Guvenc | H04W 52/244 370/329 |
| 2010/0180256 | A1* | 7/2010 | Gorthi | G06F 11/3684 717/124 |
| 2010/0229155 | A1* | 9/2010 | Adiyapatham | G06F 11/3672 717/124 |
| 2011/0053569 | A1* | 3/2011 | Karaoguz | H04W 88/04 455/414.1 |
| 2011/0200084 | A1* | 8/2011 | Griesing | H01Q 3/267 375/224 |
| 2011/0274093 | A1 | 11/2011 | Sing | |
| 2012/0094658 | A1 | 4/2012 | Macias | |
| 2012/0149387 | A1 | 6/2012 | Rawat | |
| 2013/0033562 | A1 | 2/2013 | Naidu et al. | |
| 2014/0053126 | A1 | 2/2014 | Watson | |
| 2014/0146801 | A1* | 5/2014 | Laha | H04W 4/18 370/338 |

OTHER PUBLICATIONS

Alvaro Valcarce et al.; Limited Access to OFDMA femtocells; 2009 IEEE; 5 pages; <https://ieeexplore.ieee.org/stamp/stamp.jsp?tp=&arnumber=5450325>.*

Guillaume de la Roche et al.; Access Control Mechanisms for Femtocells; 2010 IEEE; pp. 33-39; <https://ieeexplore.ieee.org/stamp/stamp.jsp?tp=&arnumber=5394027>.*

Jeffrey G. Andrews et al.; Femtocells Past, Present, and Future; 2012 IEEE; pp. 497-508; <https://ieeexplore.ieee.org/stamp/stamp.jsp?tp=&arnumber=6171992>.*

Mohammadreza Behjati et al.; Self Organizing Network Interference Coordination for Future LTE Advanced Networks; 2013 IEEE; 5 pages; <https://ieeexplore.ieee.org/stamp/stamp.jsp?tp=&arnumber=6621759>.*

Nicola Baldo et al.; An Open Source Model for the Simulation of LTE Handover Scenarios and Algorithms in ns-3; 2013 ACM; pp. 289-298; <https://dl.acm.org/citation.cfm?id=2507940>.*

Anonymous: "UmbrellaSDK—Cross-platform Mobile Development for iPhone and Android—JavaScript Library API and IDE," May 31, 2012, XP055224949, Retrieved from the internet: URL: https://web.archive.org/web/20120531145623/http://www.umbrellasdk.com/index.htm.

Extended Search Report from corresponding European Application No. 12 425 191.9 dated Nov. 6, 2015, 9 pages.

Extended European Search Report issued in corresponding EP Application No. 12 425 191.9 dated Jun. 6, 2013, 8 pages.

Tormey, J. "How to Engage Developers in Femtocell API Use", Internet citation, May 26, 2011 NP-002697234, retrieved from the internet: URL:http://www.wilson-street.com/2011/05/how-to-engage-developers-in-femtocell-api-use/ retrieved on May 16, 2013, 4 pages.

Anonymous: "First Software Development Kit for Femtocells Announced", Internet citation, Jun. 21, 2011, XP-002697235, retrieved from the internet: URL:http://www.cellular-news.com/story/49675.php, retrieved May 16, 2013, 2 pages.

Edward Mutafungwa; Applying MTC and Femtocell Technologies to the Continua Health Reference Architecture; 2012 LNCS; pp. 105-114; <http://link.springer.com/chapter/10.1007/978-3-642-27916-4_12>.

Faisal Tariq et al.; Dynamic Fractional Frequency Reuse Based Hybrid Resource Management for Femtocell Networks; 2011 IEEE; pp. 272-277; <http://ieeexplore.ieee.org/stamp/stamp.jsp?tp=&arnumber=5982545>.

Preston A. Cox; Mobile cloud computing; 2011 IBM; 9 pages; <http://perma-archives.org/warc/034FikSeBBF/id_/file:/034FikSeBBF/cap.pdf>.

Shi Chen et al.; Interference Mitigation and Capacity Optimization in Cooperative Public Femtocell Networks with Cognitive Enabled Multi-element Antennas; 2012 IEEE; pp. 552-556; <http://ieeexplore.ieee.org/stamp/stamp.jsp?tp=&arnumber=6477633>.

Nessrine Chakchouk et al.; QoS-Aware Autonomous Distributed Power Control in Co-Channel Femtocell Networks; 2012 IEEE; pp. 567-571; <http://ieeexplore.ieee.org/stamp/stamp.jsp?tp=&arnumber=6503173>.

Mustafa Y. Arslan; FERMI A Femtocell Resource Management System for Interference Mitigation in OFDMA Networks; 2011 ACM; pp. 25-36; <http://dl.acm.org/citation.cfm?id=2030617&CFID=598319781&CFTOKEN=41441421>.

Wujie Zheng et al.; Cross-Library API Recommendation using Web Search Engines; 2011 ACM; pp. 480-483; <http://dl.acm.org/citation.cfm?id=2025197&CFID=568432178&CFTOKEN=86727057>.

Michi Henning; API design matters; 2007 ACM; pp. 24-36; <http://dl.acm.org/citation.cfm?id=1255422&CFID=568432178&CFTOKEN=86727057>.

Douglas N. Knisely et al.; Standardization of Femtocells in 3GPP; 2099 IEEE; pp. 68-75; <http://ieeexplore.ieee.org/stamp/stamp.jsp?tp=&arnumber=5277458>.

D. Knisely et al.; 3GPP Standardization of Femtocells; 2011 World Applied Programming; pp. 44-54; <http://waprogramming.com/papers/50ae44dc2e2fb5.97880575.pdf>.

Edward Mutafungwa et al.; Reduced Power Consumption for 3GPP-Compliant Continua Health Devices by Deployment of Femtocells in the Home Environment; 2011 Springer; pp. 173-180; <http://link.springer.com/chapter/10.1007/978-3-642-29734-2_24>.

(56) References Cited

OTHER PUBLICATIONS

Faisal Tariq et al.; Virtual Clustering for Resource Management in Cognitive Femtocell Networks; 2011 IEEE; 7 pages; <http://ieeexplore.ieee.org/stamp/stamp.jsp?tp=&arnumber=6078960>.

* cited by examiner

COMMUNICATIONS NETWORK, COMPUTER ARCHITECTURE, COMPUTER-IMPLEMENTED METHOD AND COMPUTER PROGRAM PRODUCT FOR DEVELOPMENT AND MANAGEMENT OF FEMTOCELL-BASED APPLICATIONS

RELATED APPLICATIONS

This application is a Continuation of U.S. patent application Ser. No. 13/800,457, filed on Mar. 13, 2013, which claims priority under 35 USC 119 to European Patent Application No. 12 425 191.9, filed on Nov. 30, 2012, both of which are herein incorporated by reference in their entireties.

TECHNICAL FIELD

The description is directed generally to communications networks, particularly femtocell-based mobile telecommunications networks, and, in particular, to a communications network, a computer architecture, a computer-implemented method, and a computer program product for development and management of femtocell-based applications.

BACKGROUND OF THE INVENTION

At present, many (mobile) network operators such as VODAFONE™ SFR™, AT&T™, SPRINT™, VERIZON™, MOBILE TELESYSTEMS™, T-MOBILE™ have launched femtocell-based applications and/or services within their networks. For mobile network operators, a femtocell may improve coverage and/or capacity, in particular indoors. Users may benefit from improved coverage and potentially better voice quality and/or battery life.

In telecommunications, a femtocell relates to a small, low-power access point such as a cellular base station, substantially designed for use in a small local area, particularly indoors such as at home and/or in an enterprise. A femtocell may be a subset of a smallcell which requires a specific hardware so that existing WiFi and/or DSL routers may not be upgraded to femtocell. A femtocell substantially connects to a mobile operator network via broadband (e.g. DSL, cable). Femtocells may be sold by a mobile network operator to its residential customers and/or enterprise customers (hereinafter referred to as users). A femtocell is substantially the size of a residential gateway or smaller and connects to the user's broadband line (e.g. DSL, cable). Integrated femtocells, which may include both a router and a femtocell, are also available.

Once plugged in, a femtocell may connect to the mobile operator network and provides extra coverage and/or capacity. From a user's perspective, it is plug-and-play there is no specific installation and/or technical knowledge required so that anyone can install a femtocell in a specific local area such as at home. Usually, the user then declares which mobile phone numbers are allowed to connect to the plugged-in femtocell. This may be done via a web interface provided by the mobile network operator through the femtocell. When mobile devices operating under at least one of the registered numbers arrive under coverage of the femtocell, they switch over from a macrocell to the femtocell automatically. A macrocell is a cell in a mobile operator network that provides radio coverage served by a high power cellular base station (which is also referred to as a tower).

Currently available designs may support two to four active user devices such as mobile phones, smart phones, tablets, PCs, notebooks, etc. in a residential setting and eight to 16 active user devices in enterprise settings, for example. A femtocell may allow service providers to extend service coverage indoors and/or at the cell edge, for example where access would otherwise be limited and/or unavailable.

Users and/or mobile network operators may benefit from femtocells. Femtocells may provide improved cellular coverage, capacity and/or applications for homes and/or enterprises as well as metropolitan and/or rural public spaces. Such applications are referred to as femtocell-based applications. Femtocell-based applications substantially allow user devices and/or network applications to benefit from the cheap and fast data connections and location-awareness provided by femtocells. In femtocell-based applications, a femtocell may act as a portal to in-home services and/or automation with high-bandwidth connected-home applications and thereby delivering presence, context, and/or location in such applications. Examples of femtocell-based applications may include home security with secure home access, virtual home phones, virtual fridge notes, etc. In a secure home femtocell-based application, the application might be operable to detect presence of unknown mobile devices, to turn on high definition security cameras, to alert the user via SMS and/or to send automatically send an alert to the policy, to create log of user devices, etc.

Femtocells may provide offload of Radio Access Network (RAN) Mobile: User may use femtocells as an alternative to the macro radio network because the signal is stronger at their point of use. Femtocells enable a new breed of mobile services that exploits the technology's ability to detect presence, connect and/or interact with existing networks. Femtocells emit low levels of radio waves, also known as Radio Frequency (RF) electromagnetic fields in use.

In order to speed up service and/or application development the Small Cell Forum has published a series of application programming interfaces, APIs, which address issues related to lack of standardization among femtocells. Femtocell standards for UMTS (release 8); LTE (release 9), CDMA, and/or WiMac are developed.

Although different standardization attempts to femtocells exist, however, no standards exists for supporting developers, administrators, and/or users in efficient, easy, flexible, but standardized, techniques for femtocell-based application development and/or management which may be useful to manage technical issues such as the variety of network topologies femtocells may be designed to interact with, the poor presence information provided by many models of femtocells, which may be limited to the International Mobile Subscriber Identity, IMSI, and/or prevents the development of advanced application, the management of non-standardized femtocells already deployed. In other words, no standard way for managing a femtocell-based application's whole lifecycle exists.

Hence, there is a need to provide systems and methods for standardization of application and/or service development for femtocell networks.

SUMMARY OF THE INVENTION

According to one general aspect a communications network for development and management of femtocell-based applications is provided. The network may comprise: at least one femtocell; a mobile operator network; and a computer architecture integrated in the mobile operator network, wherein the computer architecture is operable to support development and lifecycle management of at least one femtocell-based application for the at least one femtocell in the mobile operator network.

For example, the architecture may extend application programming interface, API, standardization efforts for femtocells to a standardized femtocell-based network environment, in particular, with regard to standardized femtocell-based application development, deployment, and/or management. In other words, the architecture supports efficient, flexible, and/or integrated lifecycle management of femtocell-based applications and, hence, provides a standardized way for developing and managing femtocell-based applications. The architecture may be implemented around the APIs of femtocells.

Advantageously, the architecture may support easy, flexible and efficient development and/or management of femtocell-based applications by standardized processes, building blocks and/or interfaces provided with the architecture. The architecture may support safe operations based on private data and/or filtered access to the Internet. Faster development of femtocell-based applications through a service creation environment and/or a network layer may be supported. The network layer is operable to hide network complexity, integration issues, and/or the differences among different femtocells. Also, easier development of femtocell-based applications due to a standardized execution environment and/or a standardized application packaging format is supported.

According to an aspect, the network may further comprise: a developer graphical user interface (GUI), wherein development of the femtocell-based application is supported through the developer GUI interfaced to a creation environment of the architecture by a developer API.

According to another aspect, the network may further comprise: an administrator GUI, wherein lifecycle management of the femtocell-based application is supported through the administrator GUI interfaced to an execution environment of the architecture by an administrator API.

According to yet another aspect, the mobile operator network may comprise an operator portal and wherein at least one of the APIs is operable to integrate the computer architecture with the operator portal.

According to yet another aspect, the architecture may be implemented with its own GUIs and runs as a standalone system within the mobile operator network as a cloud application.

For example, the architecture may be deployed as a cloud application into a mobile operator network available to corresponding mobile network operators and/or third parties developing femtocell-based applications for femtocells, wherein the femtocell-based applications can be distributed from the third parties to users and/or the mobile network operators via the mobile operator network.

According to another general aspect, a computer architecture for development and management of femtocell-based applications is provided, wherein the computer architecture is integrated in a mobile operator network, and wherein the computer architecture is operable to support development and lifecycle management of at least one femtocell-based application for at least one femtocell in the mobile operator network.

According to an aspect, the architecture may comprise a creation environment, wherein development of the femtocell-based application is supported through a developer GUI interfaced to the creation environment by a developer API.

According to another aspect, the architecture may comprise an execution environment, wherein lifecycle management of the femtocell-based application is supported through an administrator GUI interfaced to the execution environment by an administrator API.

According to yet another aspect, at least one of the APIs may be operable to integrate the computer architecture with an operator portal of the mobile operator network.

According to yet another aspect, architecture may comprise one or more application APIs, wherein the at least one femtocell-based application is operable to interact with the execution environment through the application APIs.

According to yet another aspect, the architecture may be implemented with its own GUIs and runs as a standalone system within the mobile operator network as a cloud application.

According to another general aspect, a computer-implemented method for development and management of femtocell-based applications is provided. The method may comprise: providing a computer architecture and a mobile operator network; and integrating the computer architecture in the mobile operator network, wherein the computer architecture is operable to support development and lifecycle management of at least one femtocell-based application for at least one femtocell in the mobile operator network.

According to an aspect, development of the femtocell-based application may be supported through a developer GUI interfaced to a creation environment of the architecture by a developer API.

According to another aspect, lifecycle management of the femtocell-based application may be supported through an administrator GUI interfaced to an execution environment of the architecture by an administrator API.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

DETAILED DESCRIPTION OF THE INVENTION

In the following, a detailed description of examples will be given with reference to the drawings. It should be understood that various modifications to the examples may be made. In particular, elements of one example may be combined and used in other examples to form new examples.

Figure 1:
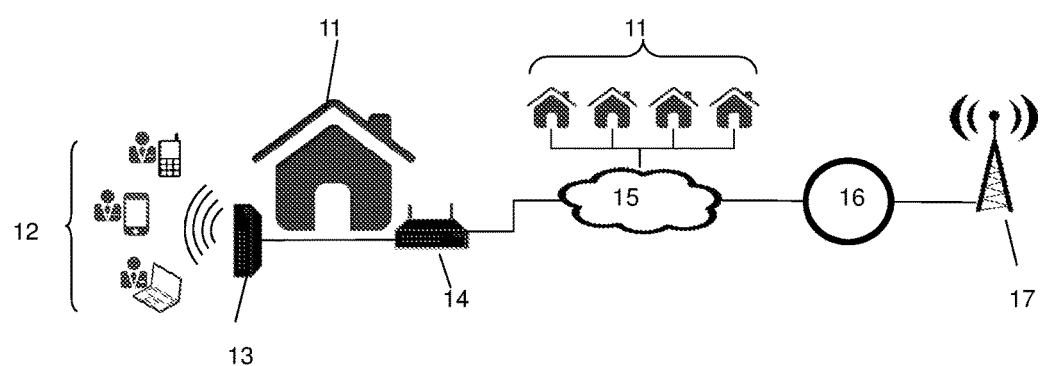
FIG. 1 shows an exemplary femtocell-based communications network.

FIG. 1 shows an exemplary communications network 10 comprising at least one femtocell 13. The network 10 may be operated by a mobile network operator such as VODAFONE™, SFR™, AT&T™, SPRINT™, VERIZON™, MOBILE TELESYSTEMS™, T-MOBILE™, etc. In the network 10, a mobile network operator provides the corresponding mobile operator network 16 through high power cellular base stations (also referred to as tower) 17 for Internet access 15 to a plurality of local areas 11 such as a home, an enterprise, metropolitan and/or rural public spaces.

Within a local area 11, at least one user may connect through a user device 12 to a femtocell 13. Examples of user devices may include mobile phones, smart phones, PCs, notebooks, tablets, etc. The femtocell 13 access point provides greater network functionality (e.g. radio resource control function) than found in macrocell base stations (e.g. 17). The femtocell 13 therefore enables greater autonomy including self-configuration and/or self-optimization. The femtocell 13 is connected to the network operator's towers 17 using broadband IP such as a broadband router 14 (e.g. DSL, a cable modem, WiFi). In other words, the femtocell 13 requires a specific hardware so that existing WiFi and/or DSL routers 14 may not be upgraded to a femtocell 13. Femtocells 13 may be sold by a mobile network operator to users. Integrated femtocells, which may include both a broadband router 14 and a femtocell 13, may be also used.

Once plugged in into a local area of a network 10, the femtocell 13 may connect to the mobile operator network 16 and provides extra coverage and/or capacity. From a user's perspective, it is plug-and-play there is no specific installation and/or technical knowledge required so that anyone can install a femtocell 13 in a specific local area 11. The femtocell 13 may comprise a web interface (not shown) provided by the mobile network operator of the mobile operator network 16. The web interface may support registration of phone numbers to the femtocell 13, access to and/or deployment of femtocell-based applications provided by the mobile network operator, for example.

Several femtocell-based applications which may be provided by a mobile network operator and/or by a third party offering applications to a mobile network operator are available. Example femtocell-based applications may comprise personalized content pushing, device management, virtual home number management, and/or smart home services such as a home security, virtual fridge notes, virtual home phones. Femtocell-based applications may be provided through a web interface of a femtocell 13 interacting with one ore more user devices 12 of the user.

Within personalized content pushing, for example, each time a user, operating a registered user device 12, enters his home, specific content is pushed according to the user's profile and/or preferences specified in the corresponding femtocell-based application. Eventually, the user may be directed to the online store, to buy premium content. Examples may comprise TV guide and recommendation, news, horoscope, and/or personal reminders. For example, a user may access a web portal through a registered user device 12 in order to select and/or edit data that the user wishes to receive when arrived at home and/or the user may receive data which redirects to online stores, for example.

Within a device management femtocell-based application, a user may configure configuration profiles for his user devices 12, which are automatically enabled depending on the user's location. The user may configure his own settings for each femtocell 13 he is registered to, wherein each time the user may enter a specific femtocell 13 (e.g. home, office, theatre), a device manager application may configure the user device 12 according to the user settings such as ringtone, sound volume, themes, APN, proxy, bookmarks, predefined home page, etc. Further services (e.g. automatic synchronization of contact lists when entering, calendars, and/or backup of multimedia) may be also supported by such a femtocell-based application.

Within a virtual home number femtocell-based application based on the user location, the femtocell-based application calls to a registered user device 12 to be routed, following user's preferences. For example, calls to the user's mobile phone 12 when the user is at home can be automatically redirected to the user's landline. In another example, calls to the user's landline when the user is not at home may be redirected to his mobile phone 12 and/or to a voicemail service 12.

Within a smart home femtocell-based application, the application may support for example, automatically turning off all the lights when nobody is at home, a family locator and/or family alerts, mobile device remote control.

Femtocell-based applications may reside in a user device 12 registered with a femtocell 13, on the femtocell's 13 access point, on a local LAN, in the mobile operator network 16 including a femtocell gateway, an application server, an application cloud, and/or the Internet.

Figure 2:
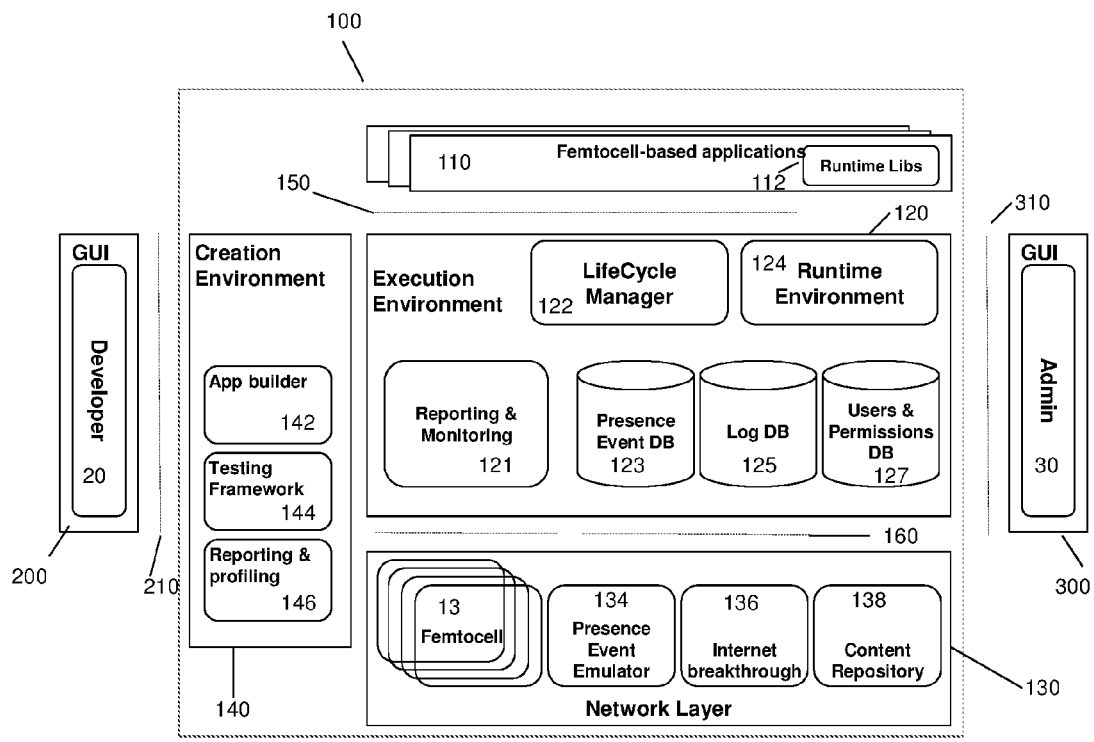
FIG. 2 shows an exemplary software and/or hardware architecture for standardized femtocell application and/or service development.

FIG. 2 shows an exemplary block diagram of a software and/or hardware architecture 100 providing an integrated environment to support whole lifecycle management of femtocell-based applications 110. The architecture 100 is associated with the mobile operator network 16. For example, the architecture may be deployed and/or implemented in the mobile operator network 16 as shown in FIG. 1, for example as a cloud application, which may be also available to third parties developing femtocell-based applications 110.

The architecture 100 may extend application programming interface, API, standardization efforts for femtocells 13 to a standardized femtocell-based network environment, in particular, with regard to standardized femtocell-based application development, deployment, and/or management. In other words, the architecture 100 supports efficient, flexible, and/or integrated lifecycle management of femtocell-based applications 110 and, hence, provides a standardized way for developing and managing femtocell-based applications 110. The architecture 100 may be implemented around the APIs of femtocells 13.

In one implementation, the architecture 100 may be implemented around the APIs of femtocells 13 basically by means of a chain of one or more wrappers decoupling an actually implemented femtocell from a standard femtocell, for example according to standards specified by the small cell forum. In one example, the architecture 100 may support the following chain of wrapper-based translations:

A developer 20 of a femtocell-based application 110 may call a program function (e.g. in a function call) in any programming language. The program function is specified by the small cell forum API specification so that the developer 20 needs not to care about details of the femtocell 13 and/or the network topology.

In order to notify the mobile operator network about the application action, (a) runtime library(-ies) 112, linked to the femtocell-based application 110 are operable to translate the function call in one or more web service calls which can be managed by a runtime environment 124. The web service calls may compliant with the small cell forum API specifications for standard femtocells.

The runtime environment 124 is operable to leverage programming logics of the actually implemented femtocell 13 and/or the topology of the mobile operator network in order to translate the standard API of the femtocell 13 into a femtocell-specific API which may or may not comply with the small cell forum standard.

The above described translation may be also valid in the reverse direction, for example when a femtocell 13 notifies a femtocell-based application 110 about an event that occurred such as a registered user device entering under coverage of the femtocell 13. In this case the following wrapper-based translations may be performed:

The femtocell 13 notifies the runtime environment 124, for example directly and/or via the mobile operator network.

The runtime environment 124 translates the notification based on the standard API for the femtocell 13 as specified by the small cell forum and notifies the runtime library 112.

The runtime library 112 calls a developer function, referred to as a callback function, wherein the callback function call is compliant with a standard small cell forum API and the femtocell-based application 110 may then take the required action resulting from the user device entering under coverage of the femtocell 13.

Data and/or information which can be provided and/or supported by a femtocell 13 may be provided through the standard APIs for femtocells 13 as specified by small cell forum. Said data and/or information may comprise:

Presence information: when a registered user device enters, leaves and/or is present within the coverage of a femtocell 13.

Routing information: access to a routing table for the mobile operator network.

Service Discovery information: the ability to discover services in the mobile operator network.

Capability information: what throughput the femtocell 13 can support and/or which user device can use the throughput, for example.

Secure remote access: the ability to connect remotely to a local area of a network from a user device.

To deliver this information to femtocell-based applications 110, APIs may be present in the handset, from the femtocell access point and/or from the femtocell gateway. Femtocell-based applications 110 may use said information and/or data set to deliver a wide range of services to user devices.

Preferably, the architecture 100 may be deployed as a cloud application into a mobile operator network 16 available to corresponding mobile network operators and/or third parties developing femtocell-based applications 110 for femtocells 13, wherein the femtocell-based applications 110 can be distributed from the third parties to users and/or the mobile network operators via the mobile operator network 16.

The architecture 100 may support easy, flexible and efficient development and/or management of femtocell-based applications 110 by standardized processes, building blocks and/or interfaces provided with the architecture 100. The architecture 100 may support safe operations based on private data and/or filtered access to the Internet. Faster development of femtocell-based applications 110 through a service creation environment 140 and/or a network layer 130 may be supported. The network layer 130 is operable to hide network complexity, integration issues, and/or the differences among different femtocells 13. Also, easier development of femtocell-based applications 110 due to a standardized execution environment 120 and/or a standardized application packaging format is supported.

The standardized application packaging format in the architecture may be part of the femtocell-based applications 110. The standardized application packaging format may be defined by an operator of a mobile operator network and/or may comprise the application's business logic and/or the runtime libraries 112 responsible for details of interaction between a femtocell-based application 110 and the runtime environment 124. The runtime libraries 112 may be also responsible for interaction with the lifecycle manager 122 for managing the femtocell-based application 110 bundles without any intervention from the developer 20.

The femtocell-based application 110 bundles may physically run in the mobile operator network and/or external computers because the interaction between the runtime libraries 112 and the execution environment 124 can be realized by web service calls to the application API 150 such as across a network (e.g. an intranet and/or the Internet).

Femtocell-based applications 110 developed, deployed, and/or managed using the architecture 100 can be better tested with greater detail. For example, the testing framework component 144 of the creation environment 140 and/or the presence event emulator 134 in the network layer 130 may be used for testing a developed femtocell-based application 110. The testing framework component 144 may be basically implemented as a software application which executes pre-defined test suites, mimicking the behavior of the execution environment 120 in standard and/or abnormal such as particular situations. The testing framework component 144 may further record the behavior of a femtocell-based application 110. For example, said framework 144 may be used to test a response of a femtocell-based application 110 in case no answer from a femtocell 13 is received and/or the femtocell-based application's 110 behavior when a plurality of events are notified by the application 110 in a short time. The presence event emulator 134 may be implemented as a piece of software operable to mimic one or more instances of a femtocell 13, wherein two or more instances of femtocells 13 may therefore be grouped into a femtozone in order to emulate real femtocells 13 and/or traffic patterns of network communication between femtocells 13. The simulated events created by the presence event emulator 134 may be fed into the testing framework component 144 which, in turn, feeds the femtocell-based application 110 under tests. The presence event emulator 134 may impersonate one or more femtocells 13. The behavior of femtocells may be standardized by the execution environment 120. Therefore, the presence event emulator 134 may be conceived by a femtocell-based application 110 as a standard femtocell 13 and/or femtozone as fully specified by standard API to femtocells 13 of the small cell forum.

The service creation environment 140 comprises an application builder module 142, a testing framework 144, and/or a reporting and profiling module 146. The application builder module 142 provides a graphical building environment to allow developers 20 to develop application logics for a femtocell-based application 110. The testing framework 144 comprises a set of testing automation tools and/or test cases for developed femtocell-based applications 110. The set of testing automation tools and/or the test cases may be defined by a mobile network operator and/or a third party developer for corresponding femtocell-based applications 110. The creation environment 140 for developing, testing, and/or deploying femtocell-based applications 110 is provided with a corresponding application programming interface, API 210 interfacing a graphical user interface, GUI 200 for developers 20 of femtocell-based applications 110.

The execution environment 120 comprises a lifecycle manager 122, a runtime environment 124, a reporting and monitoring module 121, a presence event storage device 123, a log storage device 125, and/or a users and permissions storage device 127. The storage devices 123, 125, 127 may be implemented as relational, object-oriented, and/or XML-based databases, for example. The lifecycle manager 122 comprises one or more modules for managing deployment, upgrading, and/or removing of femtocell-based applications 110 developed by developers 20 through a GUI 200 interfaced to the creation environment 140. The runtime environment 124 is operable to abstract from a specific femtocell-based application 110 by exposing to a user and/or an administrator 30 a standardized model and/or a standardized API to femtocell-based applications 110. The standardized API that the runtime environment 124 exposes is operable to support control and/or operation of a femtocell-based application 110.

The standardized API exposed by the execution environment 124 to the femtocell-based applications 110 in order to control and interact with femtocells 13 may be implemented as part of the application API 150 interfacing the execution environment 120 and femtocell-based applications 110. The standardized API may be provided by the small cell forum.

The standardized API may be a subset of the APIs exposed by the execution environment 120. APIs exposed by the execution environment 120 may further comprise a lifecycle API, an internet breakthrough API and/or a content repository API. The APIs exposed by the execution environment 120 may be implemented as HTTP request/response transactions. The HTTP request/response transactions may not directly be handled by a femtocell-based application 110. The femtocell-based application 110 may rather interact with the runtime libraries 112 which, in turn, may be operable to handle and/or manage the HTTP request/response transactions. An exemplary implementation of the at least one runtime library 112 in Java is given at the end of the present description.

The standardized API as specified by the small cell forum may comprise the following specifications and/or interfaces:

Femto Awareness: Provides a subscription service for notifying femtocell-based applications 110 when a user device enters, is in, transitions, etc. the coverage of a femtocell and/or a femtozone. This feature may further enable a femtocell-based application 110 to query user devices within the coverage of a femtocell and/or a femtozone. Further, operations available to query a status of a femtocell are provided. An exemplary implementation of the Femto Awareness API is given below.

SMS: An interface to send SMS messages to one or more user devices. Said interface may provide awareness of sent SMS message delivery status and/or incoming SMS messages.

MMS: An interface to send MMS messages to one or more user devices. Said interface may provide awareness of sent MMS message delivery status and/or incoming MMS messages.

Terminal Location: An interface to provide queries for the location of a user device camped on a femtocell.

Femto Presence (API for device): An interface to provide a handset with a notification upon its own entry, exit and/or transition within coverage of a femtocell and/or a femtozone.

Rich Terminal Location: An interface to provide accurate location of a user device.

Terminal Status: An interface to provide status data on a user device. The interface may further notify a call status (e.g. initiates a call, terminates a call) of a user device operated in a femtocell-based application 110. The interface may provide a femtocell-based application 110 with the opportunity to manipulate the call set up of a user device under coverage of a femtocell 13 used by said application 110.

Redirection APIs: An interface which can be used by user devices to configure for example setup routes, filtering, etc. Specific APIs can be identified for web redirection. For example, a femtocell 13 using said interface may perform redirection of a HTTP request from a user device operating under coverage of a femtocell 13 to a specified URL.

Service Discovery APIs: An interface which can be accessed by a user device to configure service discovery such as local network device awareness through a device discovery process.

Configuration APIs: An interface which may be used by a femtocell-based application 110 to read and/or modify parameters in a femtocell 13 and/or the execution environment 120.

Authentication/Initialization APIs: An interface which may be used by a femtocell-based application 110 to:
  authenticate the femtocell-based application 110 with a femtocell 13,
  initialize with the execution environment 120, and/or
  discover what services and/or APIs are available to the femtocell-based application 110.

The authentication/initialization API is invoked by the femtocell-based application 110 before invoking any other API. The authentication/initialization API includes a security handshake to exchange encryption key data to generate a digest that the femtocell-based application 110 can use for subsequent communications with the execution environment 120 and/or to encrypt subsequent communications. Different security mechanisms may be supported depending on a deployment scenario and/or on where a femtocell-based application 110 is running, e.g. locally, remotely.

Utility APIs: An interface which is operable to ensure that a femtocell-based application 110 can properly run on a specific femtocell in case said application is locally running on said femtocell 13, and/or can properly communicate with the femtocell if said application 110 is running remotely to said femtocell 13.

In the following an example implementation of the RESTful interface for the above mentioned Femto Awareness API of the standardized API for femtocells 13 as specified by the small cell forum in terms of HTTP URI's used to invoke operations is given:

Femto Awareness Notifications Subscribe/Unsubscribe: Operation usable by a femtocell-based application 110 to initiate a subscription for a particular femtocell 13 and/or femtozone to receive notifications when a user device hands over to an associated femtocell 13—either from the mobile operator network, to the mobile operator network and/or between femtocells 13 within a femtozone, wherein a HTTP POST may be used to start a subscription and/or a HTTP DELETE may be used to terminate a subscription.

Query FemtoZone List: Operations for HTTP GET queries for identifiers of a femtocell and/or femtozone a femtocell-based application is authorized use.

| Request | Description |
| --- | --- |
| GET http://example.com/1/zonalpresence/zone/ HTTP/1.1 Host: example.com:80 Accept: application/xml | Use GET to get a list of identifiers for zones authorized for use by the application. |

| Successful Response | Description |
| --- | --- |
| HTTP/1.1 200 OK Content-Type: application/xml Content-Length: 1000 Date: Thu, 4 Jun. 2009 02:51:59 GMT <zone-list> <zone zone-id = "yumscoffee"/> <zone zone-id = "bigBoxElectronics"/> <zone-list/> | Returns 200 OK if the operation is successful. The response will include a list of zone elements containing identifying zones that the application is authorized to use. |

Query FemtoZone Status: Operations for querying statistics and/or status of a femtocell 13 and/or a femtozone using HTTP GET queries status and/or relevant statistics.

| Request | Description |
| --- | --- |
| GET http://example.com/1/zonalpresence/zone/status/?zone-id="yumscoffee" HTTP/1.1 Host: example.com:80 Accept: application/xml | Use GET to get a zone status. The zone-id is passed as an attribute in the HTTP request. |

| Successful Response | Description |
| --- | --- |
| HTTP/1.1 200 OK Content-Type: application/xml Content-Length: 1000 Date: Thu, 4 Jun. 2009 02:51:59 GMT <zone-status zone-id = "yumscoffee" num-users = "36" num-access-points = "12" num-unserviceable-access-points = "1" /> | Returns 200 OK if the operation is successful. The response will include the: zone-id: As passed in the request. num-users: Number of users currently camped onto the access points within the zone num-access-points - The number of access points within the zone. Num-unserviceable-access-points: The number of inoperable access points within the zone. |

Query Femtocell Status: Operations to query statistics and/or status of a femtocell 13 within a femtozone using HTTP GET queries status including a specific access point and/or all access points.

| Request | Description |
| --- | --- |
| Case1: Status for a named set of access points GET http://example.com/1/zonalpresence/accesspoint/status/?zoneId="yumscoffee"&accessPointId="femto123" HTTP/1.1 Host: example.com:80 Accept: application/xml Case2: Status for ALL access points within the zone: GET http://example.com/1/zonalpresence/accesspoint/status/?zoneId="yumscoffee" HTTP/1.1 Host: example.com:80 Accept: application/xml | Access point status can be retrieved for sets of access points matching attribute in the request. Case 1: Status for a named set of access points - the following attributes are added in the request: zoneId accessPointId: One or more access point attributes Case 2: Status for all access points within the zone - simply pass the zoneId attribute in the request. |

| Successful Response | Description |
| --- | --- |
| HTTP/1.1 200 OK Content-Type: application/xml Content-Length: 1000 Date: Thu, 4 Jun. 2009 02:51:59 GMT <access-point-status-list zone-id = "yumscoffee" > <access-point-status access-point-id = "femto122" access-type = "femto" num-users = "16" state="SERVICEABLE" timezone = "EST" > <access-point-location longitude="-79.630554" latitude="43.677223" altitude="100.0" accuracy="10"/> </access-point-status> <access-point-status access-point-id = "femto123" access-type = "femto" num-users = "13" state="SERVICEABLE" timezone = "EST" > <access-point-location longitude="-80.630554" latitude="44.677223" altitude="40.0" accuracy="10"/> </access-point-status> <access-point-status access-point-id = "femto124" access-type = "femto" num-users = "0" state="UNSERVICEABLE" timezone = "EST" > <access-point-location longitude="-91.630554" latitude="28.677223" altitude="1.0" accuracy="10"/> </access-point-status> </access-point-status-list> | The response will contain an access-point-status-list element that will contain a set of access-point-status elements, each containing: access-point-id: the unique ID for the access point. access-type: One of femto, LTE-femto, WiFi, Wimax . . . num-users: the number of users currently on the access point. state: "SERVICABLE" or "UNSERVICEABLE" timezone=the timezone the access point is currently located. access-point-location (optional): The coordinates of the access point (which may serve as a rough location proxy to users camped onto the access point. |

Query FemtoZone Users: Operations to queries for user devices and/or their users currently registered with a femtocell 13 and/or femtozone using HTTP GET queries for user devices currently under coverage of a femtocell 13 and/or a femtozone including specific user devices within the femtocell 13 and/or the femtozone, all devices users on a specific access point, and/or all user devices currently within the femtocell 13 and/or the femtozone.

| Request | Description |
| --- | --- |
| Case 1: Query User for a specific user<br>GET<br>http://example.com/1/zonalpresence/zone/user/?zoneId="yumscoffee"&address="+16131234000"<br>HTTP/1.1<br>Host: example.com:80<br>Accept: application/xml<br>User query for a list of users on a given access point:<br>GET<br>http://example.com/1/zonalpresence/zone/user/?zoneId="yumscoffee"&accessId="femto122"<br>HTTP/1.1<br>Host: example.com:80<br>Accept: application/xml<br>Case 2: Query Users for a list of users in a zone:<br>GET<br>http://example.com/1/zonalpresence/zone/user/?zoneId="yumscoffee"<br>HTTP/1.1<br>Host: example.com:80<br>Accept: application/xml | Users currently using a zone may be retrieved for sets of access points matching attribute in the request.<br>Case 1: Query for a specific user - the following attributes are added in the request:<br>zoneId<br>address: The user MSISDN, or Anonymous Customer Reference (ACR).<br>Case 2: Query all users within the zone - simply pass the zoneId attribute in the request. |

| Successful Response | Description |
| --- | --- |
| HTTP/1.1 200 OK<br>Content-Type: application/xml<br>Content-Length: 1000<br>Date: Thu, 4 Jun. 2009 02:51:59 GMT<br><user-status-list zone-id = "yumscoffee"><br><user-status user-address="+16131234000" access-point-id = "femto122" /><br><user-status user-address="+16131235000" access-point-id = "femto122" /><br><user-status user-address="+16131236000" access-point-id = "femto123" /><br></access-point-status-list> | The response will contain an user-status-list element that will contain a set of user-status elements, each containing:<br>address: The identity of the user, either a MSISDN or Anonymous Customer Reference (ACR).<br>access-point-id: The identity of the access point the user is currently on. |

The standardized API exposed by the runtime environment 124 of the execution environment 120 may enable organization of femtocells 13 into femtozones. Access to femtocells 13 may be granted and/or denied based on a permission and/or certification provided by a corresponding user of the femtocell 13. The reporting and monitoring module 121 provides logging and/or real-time monitoring of femtocell-based applications 110. The logging data may be stored in the log storage device 125.

For administrators 30 and/or developers 20 interacting with the architecture 100 when developing and/or managing femtocell-based applications 110, the architecture 100 exposes one or more APIs 210, 310. The APIs 210, 310 may be implemented as web interfaces to access the architecture 100.

For example, the architecture 100 exposes a developer API 210 to a developer graphical user interface, GUI 200 for interaction with the front-end creation environment 140 of the architecture 100 of developers 20 developing femtocell-based applications 110. The API 210 may also provide access to users of femtocell-based applications 110, e.g. for user-defined settings of femtocell-based applications 110.

The architecture 100 may further expose an administrator API 310 to an administrator GUI 300 for interaction with the back-end execution environment 120 of the architecture 100 by administrators 30 of the architecture 100. The administrator API 310 may for example support access to the execution environment 120 for administering the architecture 100, for example by accessing and/or interacting with the data storage devices 123, 125, and/or 127 through the administrator GUI 300 regarding developer permissions, assignment of femtocells 13 to developers 20, and/or organization of femtocells 13 into femtozones and/or clusters, for example. A subset of the administrator API 310 may be used in order to provide a user configuration page. For example, a femtocell-based application 110 may enable a user of a user device 12 registered with at least one femtocell 13 and/or a developer 20 to configure application behavior and/or content for said femtocell-based application 110. For this purpose, an administrator 30 may provide end users and/or developers 20 with the user configuration page which can be uploaded into the execution environment 120. For example, a developer 20 implements a femtocell-based application 110 which supports a user of a user device registered with at least one femtocell 13 to receive a message (e.g. an SMS and/or an email) with important reminds as soon as he returns in a specific local area such as at home. An administrator 30 may deploy said femtocell-based application 110 using the lifecycle API and creates a web page in order to allow the user to configure said remind. The web page accesses the operator API 160 which provides a user ID and said reminds for said user. The execution environment 120 by leveraging one or more of the associated databases 123, 125, 127 may be operable to check the user and authorization for the femtocell-based application 110, to store the user configured content (e.g. the reminds) in the content repository 138, and/or to notify the femtocell-based application 110 about said new content. When the user is under coverage of the specific area, the femtocell-based application 110 is notified to push said reminds to the user via his registered user device.

The APIs 210, 310 may allow a mobile network operator to integrate the architecture 100 with the operator's own portal of the corresponding mobile operator network 16. Preferably, the architecture 100 may be implemented with its own GUIs 200, 300 and may run as a standalone system within the mobile operator network 16, for example as a cloud application.

The network layer 130 comprises one or more femtocells 13 provided by one or more femtocell providers and/or one or more mobile network operators. The network layer 130 may further comprise a presence event emulator 134, an Internet breakthrough 136, and/or a content repository 138. The presence event emulator 134 provides a virtual femtocell for emulating events, for example for testing purposes when testing femtocells for deployment. The present event emulator 134 may be operable to access the presence event database 123 of the execution environment 120 during testing to access presence data required for the testing. The Internet breakthrough 136 is operable to monitor access to the Internet and/or provides a firewall to femtocells 13 for femtocell-based applications 110. The content repository 138 is a storage device storing data and/or content which may be delivered, for example in a data stream, by a corresponding femtocell-based application 110 to a respective mobile device of a user during operation of the femtocell-based application 110.

The content repository 138 may store multimedia data comprising one or more of the following basic types including text, images, audio data, and/or video data:

Text: The form in which the text can be stored can vary greatly. In addition to ASCII based files, text is typically stored in processor files, spreadsheets, databases and annotations on more general multimedia objects. With availability and proliferation of GUIs, text fonts the job of storing text is becoming complex allowing special effects such as color, shades, etc.

Images: There is great variance in the quality and size of storage for still images. Digitalized images are sequence of pixels that represents a region in the user's graphical display. The space overhead for still images varies on the basis of resolution, size, complexity, and compression scheme used to store an image. Available image formats include jpg, png, bmp, tiff.

Audio: An increasingly popular datatype being integrated in most applications is Audio. Its quite space intensive. One minute of sound can take up to 2-3 Mbs of space. Several techniques are used to compress it in suitable format.

Video: One on the most space consuming multimedia data type is digitalized video. The digitalized videos are stored as sequence of frames. Depending upon its resolution and size a single frame can consume upto 1 MB. Also to have realistic video playback, the transmission, compression, and decompression of digitalized require continuous transfer rate.

Graphic Objects: Such objects comprise of special data structures used to define 2D and 3D shapes through which we can define multimedia objects. Graphic objects include various formats used by image, video editing applications. Examples are CAD/CAM objects.

One or more operator APIs 160 are provided for seamless access between the network layer 130 and the execution environment 120. The operator APIs 160 may be exposed by the network layer 130 to the execution environment 140. The operator APIs 160 may enable access to the femtocells 13 in the network layer 130 from the execution environment 120 and/or support management of femtocells 13 and/or related femtocell-based applications 110 through the execution environment 120. The operator APIs 160 are defined between functions within the mobile operator network which may be required to support femtocell-based applications 110. Said functions may comprise femtocell management including registering of new a new femtocell 13, creating a femtozone, associating a femtocell 13 to a femtozone, configure a list IMSI for a femtocell 13 and/or a femtozone and/or content repository management including adding, modifying, viewing, deleting multimedia data and/or associating, disassociating multimedia content to a femtocell 13 and/or a femtozone.

The operator APIs 160 may not be visible to a developer 20 accessing the creating environment 140 from the developer GUI 200 through the developer API 210 when developing a femtocell-based application 110 and/or configuring user-defined settings of a femtocell-based application 110.

One or more femtocell-based applications 110 developed and/or deployed in the architecture 100 comprise a runtime library and/or runtime libraries 112 link to one or more corresponding femtocell-based applications 110 for accessing the API of the corresponding one or more femtocells 13. The runtime library 112 exposes standard methods and/or attributes for managing the application lifecycle of a femtocell-based application 110 through the lifecycle manager 122 of the execution environment 120. The runtime library 112 may comprise a static and/or dynamic linking with the application logics of a femtocell-based application 110.

The runtime library 112 may be implemented for a plurality of different programming languages and/or platforms. In one exemplary implementation, the runtime libraries 112 may be implemented in Java for an android platform. With such an exemplary implementation, the runtime libraries 112 are available in the form of precompiled Java classes. In this example, a femtocell-based application 110 is implemented in Java, wherein the runtime library 112 is dynamically linked with said application 110. The file including the femtocell-based application 110 and the file including the runtime libraries 112 may be grouped together in a single JAR file, for example as chosen by the developer 20 of said application 110. In this example, the standardized API for a femtocell 13 is available as Java function calls and/or Java classes so that for the developer 20 the femtocell 13 and/or the femtozone is considered as standard Java objects. When the developer 20 interacts with a femtocell 13 represented by such a Java object, the runtime library 112 generates a web service API exposed by the execution environment 120 in order to notify the femtocell 13 about an action of the femtocell-based application 110 and/receives a reaction. The reaction may be provided to a user of a registered user device as a standard Java return value such as a Java standard object representing a result.

The runtime library 112 may be available in different languages to allow a wide choice of programming languages. Further, for a faster development process, the runtime library 112 for femtocell-based applications 110 may provide convenience methods to access applications and/or services provided by the execution environment 120 and/or the network layer 130.

For example, a femtocell-based application 110 may operate as follows: The application 110 is notified about a presence of a user device 12 under a given femtocell 13. The femtocell-based application 110 retrieves data from the content repository 138 depending on the femtocell 13 and/or a raised event. The femtocell-based application 110 pushes the retrieved data to the user device 12. In one exemplary implementation, a convenience method supports a fast binding of the identifier of the femtocell 13, the data requested and/or the push method so as to allow in a single line of code to deliver via SMS the data selected for the user device entering a given area and/or space.

Femtocell-based applications 110 developed and/or deployed in the architecture 100 are operable to interact with the execution environment 120 through application APIs 150. The application APIs 150 may be visible to an application developer 20 interacting with the architecture 100 through the developer GUI 200. The application APIs 150 may be defined for different modules and/or components such as a femtocell 13, a residential gateway, an application gateway, for example for exposing mobile operator network capabilities to third party applications, and/or application servers within the mobile operator network 16. An exemplary technical specification of the application APIs 150 and the operator API 160 is given in the following table.

| | API 160 |
|---|---|
| Femtocell Subset | Vendor specific API depending on actual femtocell model |
| Presence Event Simulator | Standard femtocell API, as the present event simulator behaves like a standard femtocell |

| | |
|---|---|
| Subset | |
| Internet breakthrough Subset | Internet standard methods for publishing and/or retrieving data, as HTTP GET, POST, PUT, DELETE methods, FTP CONNECT, USER, PASS, PASV, GET, PUT methods, the standard or secured transport layer (e.g TLS). The access to these methods will be policed by the operator which will grant permissions to developers and/or femtocell-based applications. |
| Content Repository Subset | PUT and GET methods for storing and/or accessing data. The access to these methods will be policed by the operator which will grant permissions to developers and/or femtocell-based applications. |

API 150

| | |
|---|---|
| Femtocell Subset | standard femtocell API, as the present event simulator behaves like a standard femtocell |
| Internet Breakthrought Subset | internet standard methods for publishing and/or retrieving data, as HTTP GET, POST, PUT, DELETE methods, FTP CONNECT, USER, PASS, PASV, GET, PUT methods, the standard or secured transport layer (e.g TLS). The access to these methods will be policed by the operator which will grant permissions to developers and/or femtocell-based applications. |
| Content Repository Subset | PUT and GET methods for storing and/or accessing data. The access to these methods will be policed by the operator which will grant permissions to developers and/or femtocell-based applications. |
| Lifecycle Cycle Subset | Methods calls by the lifecycle manager in order to deploy, undeploy, start and stop and/a femtocell-based application. |

The runtime environment 124 may be implemented comprising an http application server in order to receive web service calls from femtocell-based applications 110, a workflow engine in order to orchestrate the execution of a web service call, and/or a collection of interface modules for interaction. The workflow engine may comprise programming logics to identify a target femtocell-based application 110 regarding a femtocell 13 with its make and model, the internet breakthrough 136, and/or the content repository 138. In case the target is a femtocell 13, the workflow engine accesses its interface library being an internal table comprising programming logics to fulfill the request. The interface modules may interact with one or more femtocells 13, for example depending on the femtocell model through an http/s client, an http/s server, and/or a non-standard module. The interface modules may further interact with an http/s and s/ftp module in order to access the Internet via the internet breakthrough 136. The interface modules may further interact with an http client in order to access to the content repository 138.

The lifecycle manager 122 may be implemented with an internal table storing deployed femtocell-based applications 110 along with their states (e.g. ready, running, stopped, server where deployed), an http client in order to notify a femtocell-based application 110 of state changes, for example when they are about to enter and/or stop a running state, and/or an interface toward a femtocell-based application server in order to upload and/or delete a femtocell-based application 110 and/or an application bundle.

Figure 3:
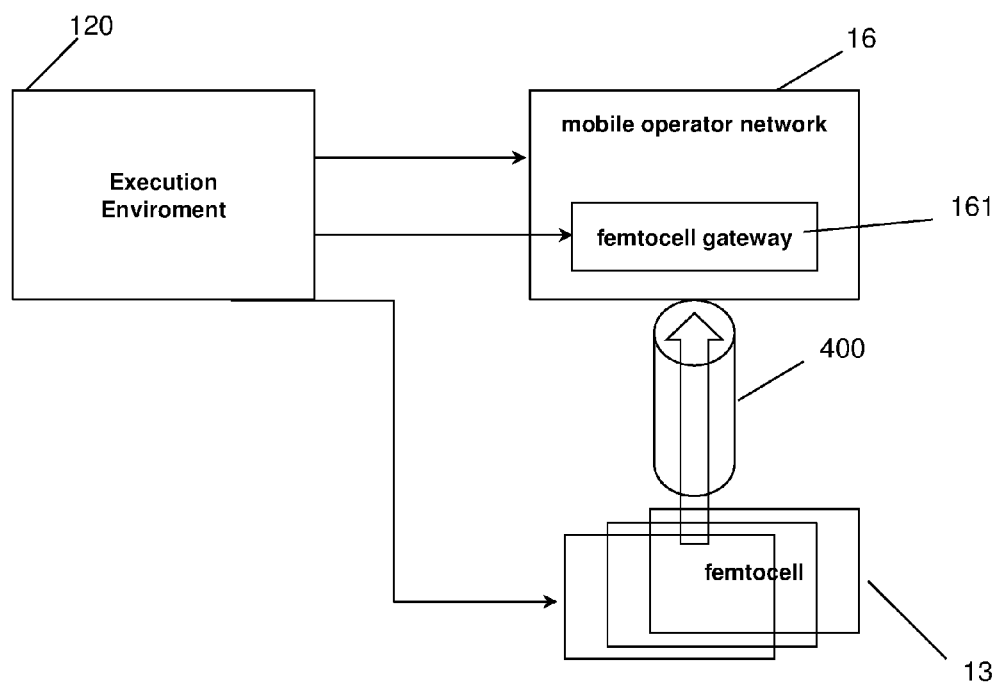
FIG. 3 shows an exemplary use of the architecture of FIG. 2 to support a topology variety and/or to handle poor presence of information in femtocell-based applications.
Figure 4:
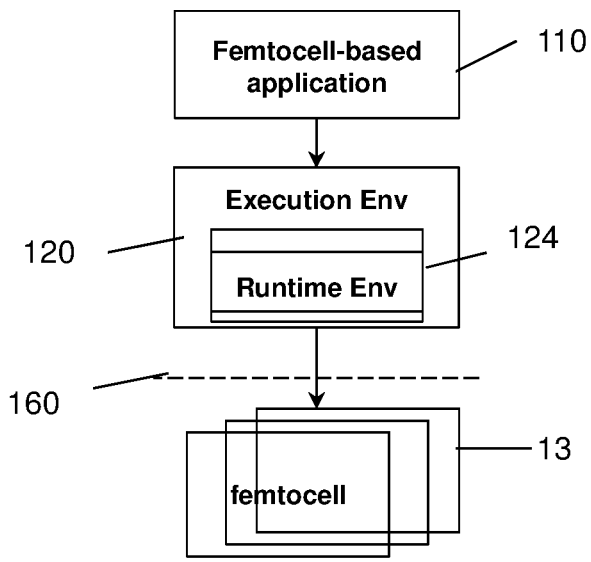
FIG. 4 shows an exemplary use of the architecture of FIG. 2 to cope with non-standard APIs of femtocells in a femtocell-based application.
Figure 5:
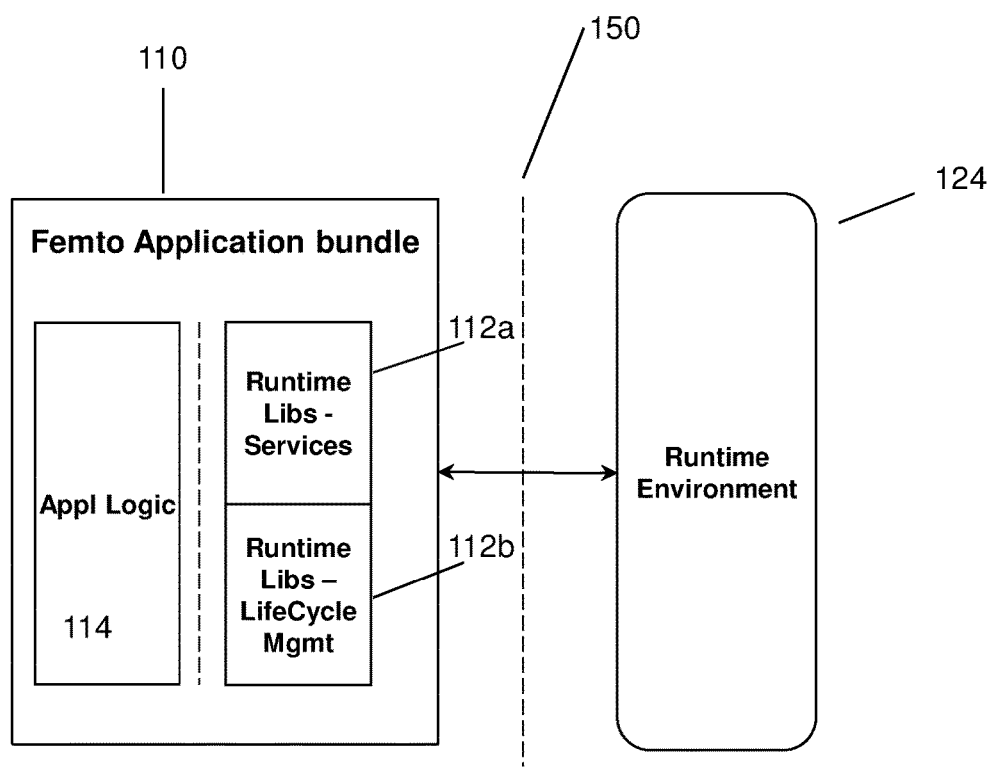
FIG. 5 shows an exemplary use of the architecture of FIG. 2 to cope with non-standard APIs and/or lifecycle management of femtocells in a femtocell-based application.

FIGS. 3 to 5 show exemplary use cases of the computer architecture 100 described above with reference to FIG. 2 for integrated development and/or management of femtocell-based applications. FIGS. 3 to 5 show that by using the computer architecture 100 technical problems arising when developing and/or managing femtocell-based applications 110 can be overcome.

FIG. 3 shows an exemplary use of the architecture 100 to enable an efficient and integrated development and/or management of femtocell-based applications 110.

The architecture 100 can support different femtocells 13 independent of a specific topology a femtocell 13 might be designed for and/or specified with. Hence, femtocells 13 can be designed for different network topologies, however, used in the same way, independent of the topology design, when developing and/or managing a femtocell-based application 110 operating on the femtocells 13.

Basically, in operation, a femtocell 13 establishes a tunnel connection 400 to a mobile operator network 16. The femtocell 13 may, however, expose its capabilities and/or functionality to the mobile operator network 16 in different manners. For example, a femtocell 13 may export corresponding presence data to the core mobile operator network 13, to a new specialized core network element referred to as a femtocell gateway 161 acting as a presence server in the mobile operator network 16, and/or the femtocell 13 may expose a public interface to the Internet 15 made available through the mobile operator network 16. A femtocell gateway 161 may comprise a security gateway that terminates large numbers of encrypted IP data connections from hundreds of thousands of femtocells, and/or a signaling gateway which aggregates and/or validates the signaling traffic, authenticates each femtocell 13, and/or interfaces with the mobile operator network 16 core switches using standard protocols such as Iu. There may be then provided an interface between the femtocell 13 access points and the femtocell gateway 161.

The architecture 100 and, in particular, the execution environment 120 is operable to hide from the above described topological details (i.e. how a femtocell 13 establishes a connection with a mobile operator network 16) of a femtocell 13 regarding exposing functionality to the mobile operator network 16. In this way, a developer 20, developing a femtocell-based application 110 for such a femtocell 13 through the developer GUI 200 by accessing the creation environment 140 of the architecture 100 becomes able to develop said application 110 independent of a specific topology of the underlying femtocell 13. Consequently, even changes to the femtocell 13 topology might not require any changes to the femtocell-based application 110 developed for said femtocell 13.

For hiding the topology details of the femtocell 13 from the application developer 20, the execution environment 120 provides one or more interfaces for polling the mobile operator network 16, for subscribing to a femtocell gateway 161, accepting registration from the femtocell 13 and/or directly querying the femtocell 13, when the femtocell 13 is manually provided to the network 16. When establishing a connection between the femtocell 13 and the network 16 using the execution environment 120 as described, the execution environment 120 is operable to retrieve required data about the femtocell 13 comprising a serial number, a MAC address, make and model, etc. which can be used in subsequent operations. The retrieved data is then used to establish a connection between the femtocell 13 and the mobile operator network 16 according to the topology of the femtocell 13 by automatically processing the corresponding interface for the femtocell 13 topology which is determined based on the retrieved data about the femtocell 13.

The mobile operator of the mobile operator network 16 and/or an administrator may be aware of femtocells 13 which can be controlled by a given femtocell-based application 110 and assigns femtocells 13 to femtocell-based applications 110 for interaction. When assigning a femtocell 13 with a femtocell-based application 110, the femtocell 13 is provided with a unique identifier, ID, and with the make and model and/or further configuration information that cannot be inferred (e.g. which femtocell gateway 161 the femtocell 13 is attached to). Based on said assigned information, the execution environment 120 is operable to look-up in a database 123, 125, 127 an associated network topology which is supported by the femtocell 13 in order to interact, for example directly, through the femtocell gateway 161 or through any other interface toward the mobile operator network 16 with the femtocell 13.

Further, when a femtocell 13 establishes a tunnel connection 400 to a mobile operator network 16, the femtocell 13 may only export an ID of the corresponding SIM Card, IMSI of a user device having entered under the coverage of the femtocell 13. The execution environment 120 of the architecture 100 is then operable to enhance presence information of the user device using the retrieved IMSI. For example, using the IMSI of the user device, the execution environment 120 is operable to add presence data to the user device under coverage of the femtocell 13, including any other related data such as IMEI, MSISDN, user details, found in the mobile operator network 16, the femtocell gateway 162, and/or in the execution environment's 120 internal data storage devices including the presence event storage device 123 and/or the user and permissions database 127.

Providing a structured and/or enriched set of presence data to a user device under coverage of a femtocell 13 may ease development of more complex femtocell-based applications 110. For example, an operator of a mobile operator network 16 may want to use and/or allow developers to use, its information about a user to provide enriched services, whereas only non-targeted services can be deployed on the basis of a standard location API since the IMSI is provided only. Allowing profiling a user based on his presence history and the data allowed by the operator enables, for example, customized advertising a femtocell-based application 110 since the femtocell-based application 110 is provided with additional information from the operator of the network 16 to choose the content to be pushed to a user device.

FIG. 4 shows a further exemplary use of the architecture 100 when deployed into a mobile operator network 16 to support efficient and/or integrated development and/or management of femtocell-based applications 110. A femtocell 13 may be provided without standard functionality and/or without a standard API. When developing a femtocell-based application 110 for such a femtocell 13, a developer 20 may consider different functionality and/or APIs provided with the femtocell 13. In order to avoid that the developer 20 needs to be aware of and to know the specific functionality and/or APIs of each femtocell 13, the runtime environment 124 of the execution environment 120 is operable to read commands such as those specified in the standardized API of the small cell forum for a target femtocell 13 of a femtocell-based application 13. Hence, a femtocell-based application 110 can be developed independent of specific functionality and/or APIs of possible femtocells 13.

FIG. 5 shows an exemplary use of the architecture 100 for handling the whole lifecycle of a femtocell-based application 110. Without using the architecture 100, a standardized delivery, maintenance and retirement process for femtocell-based applications 110 does not exists for every kind of femtocell 13.

For example, when a femtocell-based application 110 interacts with a femtocell 13 through the runtime environment 120, for example to process a request from a user, services 112a of the runtime library 112 associated with the femtocell-based application 110 forwards the request to the runtime environment 124. The runtime environment 124 then accesses data from its storage devices 123, 125, and/or 127 about the femtocell 13 retrieved during a previous development of the femtocell-based application 110. The femtocell-based application 110 interacts with the runtime environment through the API 150 in order to process the request. New model interfaces can be dynamically added to the interface library 150. Furthermore, the runtime library 112 may further isolate the application logic 114 of the femtocell-application 110 providing an identical interface 150 for any type of femtocell 13.

Using the architecture 100, a femtocell-based application 110 may be packaged into a self-contained bundle, for example, in case the femtocell-based application 110 is implemented in Java, the self-contained bundle may be packaged as JAR and/or WAR, which are standard, self-containing Java packages. For security reasons, the JAR and/or WAR bundles should be signed with one of the standard software signature methods after the testing phase and before the operator of the mobile operator network 16 decides to deploy the femtocell-based application 110 into to execution environment 120.

The packaged femtocell-based application 110 may be managed centrally and in a standardized manner using the runtime environment 124. For example, part of the runtime library 112 of the femtocell-based application 110, referred to as lifecycle management runtime library 112b may be transparent to a developer 20 of the femtocell-based application 110. Said lifecycle management runtime library 112b allows the runtime environment 124 to identify the packaged bundle for the femtocell-based application 110 and/or the developer 20 of said application 110, to check the developer's 20 signature and integrity, and/or to perform version management including storing, deploying, starting, stopping and/or un-deploying operations on the femtocell-based application 110.

Further, for each femtocell 13 in a femtozones (bundle), the runtime environment 124 is operable to retrieve the femtozones make and mode which can be retrieved from an attachment phase, to access the function translation table provided with a command and/or the make & model of the respective femtocell 13, to find femtocell-specific functions, to execute the command, and/or to provide a result.

Figure 6:
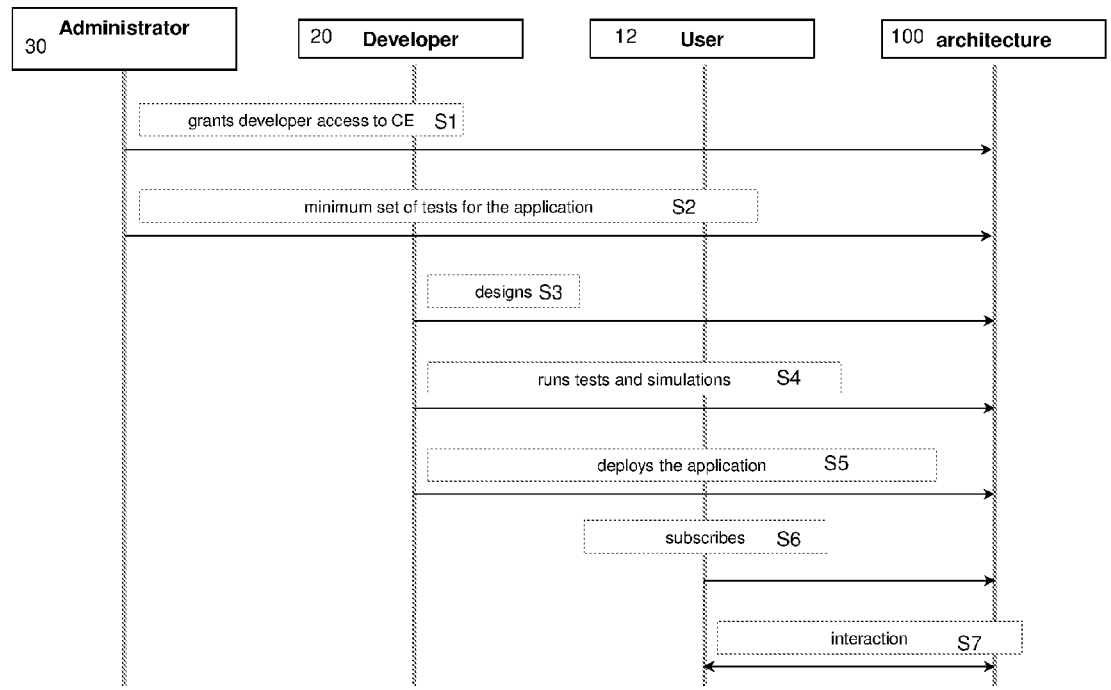
FIG. 6 shows an exemplary flow diagram for designing femtocell-based applications using the architecture of FIG. 2.

FIG. 6 shows an exemplary method using the computer architecture 100 as shown in FIG. 2 to develop and manage femtocell-based applications 110 in an efficient, easy, integrated and/or standardized manner.

The architecture 100 may be associated with (e.g. integrated in, deployed within, connected to, implemented within) a mobile operator network 16 as shown in FIG. 1. An administrator 30 (of a third party and/or the operator of the mobile operator network) may interact with the architecture 100 through an administrator GUI 300 interfaced to the architecture 100. At S1, the administrator 30 grants an application developer 20 access to the creation environment 140 of the architecture 100 to develop a femtocell-based application 110. The femtocell-based application can be developed for any kind of femtocell 13 and/or independent of a specific femtocell 13 and/or independent of specific technical requirements such as a topology, APIs, functionality, etc. of a femtocell 13. At S2, the administrator 30 may enforce a minimum set of test cases the femtocell-based application 110 to be developed need to pass. For example, the administrator 30 provides in the testing framework 144 of the creation environment 140 the test cases together with required data.

Having granted access to the creation environment 140, the developer 20 designs, builds, and/or implements a femtocell-based application 110 through the developer GUI interfaced 210 to the creation environment 140, S3. The developer 20 deploys the developed femtocell-based application 110 into the mobile operator network 16 of a mobile network operator (also referred to as operator) for access and/or use by one or more users when operating at least one user device 12 plugged-in and/or registered at a femtocell 13.

The test cases for the femtocell-based application 110 can be run by an end user through his user device 12 under coverage of a femtocell 13 when accessing the developed femtocell-based application 110 a first time, S4. Alternatively and/or additionally, the administrator 30 may run the test cases on the developed femtocell-based application 110 before deployed into the mobile operator network 16. Subsequently, the femtocell-based application 110 is deployed into the mobile operator network 16, S5.

A user having at least one user device 12 registered to at least one femtocell 13 may subscribe, when the user device 12 is under coverage of the femtocell 13, to one or more femtocell-based applications 110 (including the previously developed and deployed one), for example from the mobile network operator's portal and/or an electronic femtocell application store provided through the user device 12, S6. In interaction of the femtocell-based application, S7, the user device 12 and the architecture 100 interact to process requests within the femtocell-based application 110, the user has subscribed to with his user device 12.

Figure 7:
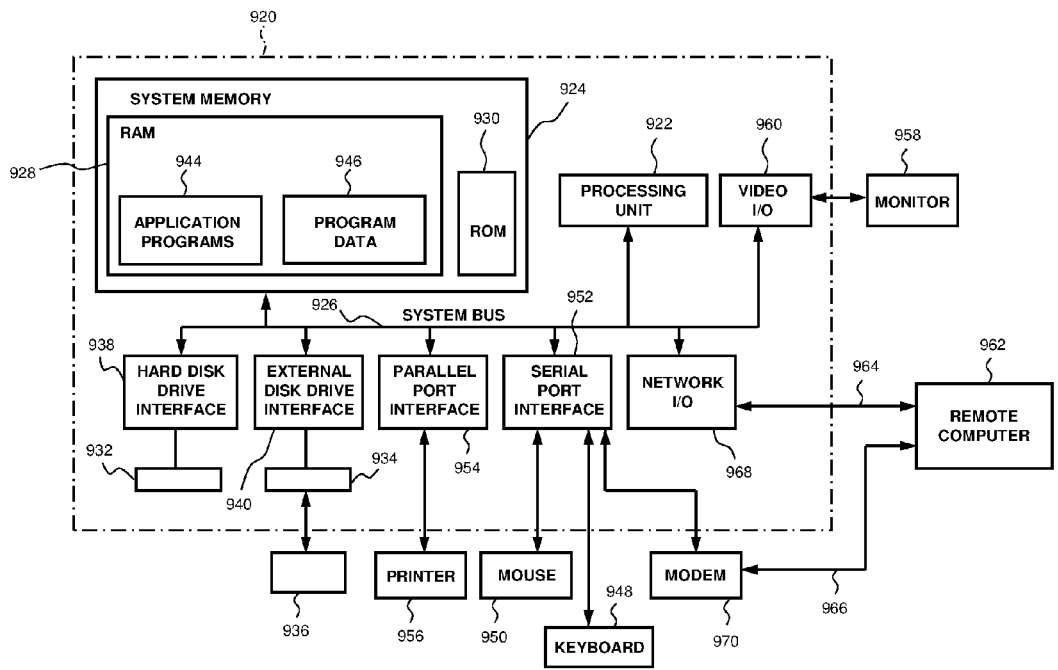
FIG. 7 shows an exemplary computer system and/or computer network system for implementing a computer network, a computer system, and a computer-implemented method as shown in FIGS. 1 to 6.

FIG. 7 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and nonvolatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for development and management of femtocell-based applications, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 6.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 7 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 7 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for development and management of femtocell-based applications.

In the following, an exemplary implementation of the runtime libraries 112 in Java is given. The program code may be comprised in the runtime libraries 112 for at least one femtocell-based application 110, and may use the standardized API which can be implemented as HTTP request/response transactions in order to interact with femtocells 13 thereby exposing standard Java objects to the femtocell-based application 110.

---

CLASS ZONE

---

```
public class Zone {
    private String zoneId;
    private FemtoAppServer femtoAppServer;
    /* *
     * Constructors
     */
    public Zone( );
    public Zone(String zoneId, FemtoAppServer femtoAppServer);
    /**
     * @return Complete Status of Users by Query Zone Status
     */
    public HashMap<String, Integer> getStatus( );
    /**
     * @return Number of Users by Query Zone Status
     */
    public int getNumUsers( );
    /**
     * @return Number of Users by Query Zone Status
     */
    public int getNumFemtocells( );
    /**
     * @return Number of Users by Query Zone Status
     */
    public int getNumUnserviceableFemtocells( );
    /**
     * @return Number of Users by Query Zone Status
     */
    public List<Femtocell> getFemtocells( );
    /**
     * @return List of Users by Query Zone Users
     */
    public List<User> getUsers( );
    /**
     * @return List of Users Camped to a specific Femtocell by Query Zone
     *        Users
     */
    public List<User> getUsersCampedTo(Femtocell fm);
    /**
     * @return True if a specific Users is Camped to the Zone by Query Zone
     *        Users
     */
    public boolean hasCamped( );
    /**
     * @return True if a specific Users is Camped to specific Femtocell of
     *        Zone by Query Zone Users
     */
    public boolean hasCamped(User user, Femtocell fm);
    /* *
     * Getter and Setter
     */
    public String getZoneId( );
    public void setZoneId(String zoneId);
    public FemtoAppServer getAs( );
    public void setAs(FemtoAppServer femtoAppServer);
    public ZoneSubscription getSubscription(ZonePresenceListener presenceListener);
}
```

---

CLASS FEMTOCELL (FEMTO)

---

```
public class Femtocell extends ApplicationServer {
    private String femtocellId;
    private String femtocellType;
    private String timezone;
    private FemtocellLocation femtocellLocation;
    private Zone zone;
    private ApplicationServer as;
    private boolean isApplicationServer;
    public enum FemtocellStatus {
        SERVICEABLE, UNSERVICEABLE, UNDEFINED;
    }
    public Femtocell(String femtocellId, String femtocellType,
            String timezone, FemtocellLocation femtocellLocation,
            Zone zone, FemtoAppServer fas);
    public Femtocell(String femtocellId, String femtocellType,
            String timezone, FemtocellLocation femtocellLocation,
            String url, String port, String nameAS, String versionApi);
    /**
     * @return Num of Users by Query Femtocell Status
     */
    public int getNumUsers( );
    /**
     * @return State of FemtocellPoint by Query Femtocell Status
     */
    public FemtocellStatus getStatus( );
    /**
     * @return List of Users by Query Zone Users
     */
    public List<User> getUsers( );
    /**
     * @return True if a specific Users is Camped to the Femtocell by Query
     *        Zone Users
     */
    public boolean hasCamped(User user);
    /**
     * @return Name of Zone
     */
    public Zone getZone( );
    public void setZone(Zone zone);
    public String getFemtocellId( );
    public void setFemtocellId(String femtocellId);
    public String getFemtocellType( );
    public void setFemtocellType(String FemtocellType);
    public String getTimezone( );
    public void setTimezone(String timezone);
    public FemtocellLocation getFemtocellLocation( );
    public void setFemtocellLocation(FemtocellLocation femtocellLocation);
    public ApplicationServer getAs( );
    public void setAs(ApplicationServer as);
    public boolean isApplicationServer( );
    public void setIsApplicationServer(boolean isApplicationServer);
}
```

---

LIST OF REFERENCE NUMERALS 10 communications network
11 local area
12 user device
13 femtocell
14 broadband router
15 Internet
16 mobile operator network
17 high power cellular base station (also referred to as tower)
20 developer
30 administrator
100 architecture
110 femtocell-based application
112 runtime library
114 application logic
120 execution environment 122 lifecycle manager
121 reporting and monitoring module
123 presence event storage device
124 runtime environment
125 log storage device
127 users and permissions storage device
130 network layer
134 presence event emulator
136 Internet breakthrough
138 content repository
140 service creation environment
142 application builder module
144 testing framework
146 reporting and profiling module
150 application API
160 operator API
161 femtocell gateway
200 developer GUI
210 developer API
300 administrator GUI
310 administrator API
400 tunnel
S1-S7 method steps
920 conventional computing environment
922 processing unit
924 system memory
926 system bus
928 random access memory (RAM)
930 read only memory (ROM)
932 hard disk drive
934 external disk drive
936 removable disk
938 hard disk drive interface
940 external disk drive interface
944 one or more application programs
946 program data
948 keyboard
950 mouse
952 serial port interface
954 parallel port interface
956 printer
958 monitor
960 video input/output
962 remote computer
964 local area network (LAN)
966 wide area network (WAN)
968 network I/O
970 a modem

We claim:

1. A method for development and management of femtocell-based applications, the method comprising:
providing a mobile operator network including a femtocell gateway, an application server, an application cloud and/or the Internet; and
implementing a computer architecture in the mobile operator network, the computer architecture being a software and hardware architecture, and wherein the computer architecture is implemented with its own graphical user interfaces and runs as a standalone system within the mobile operator network;
wherein the computer architecture is available to mobile network operators and third parties for support development and lifecycle management of at least one femtocell-based application for at least one femtocell in the mobile operator network,
wherein the computer architecture comprises:
a creation environment comprising a testing framework component including a set of testing automation tools and/or test cases for said at least one femtocell-based application, wherein development of the femtocell-based application is supported through a developer graphical user interface (GUI) interfaced to the creation environment by a developer application programming interface (API);
an execution environment comprising a runtime execution environment that communicates to the at least one femtocell-based application through at least one application API, wherein the at least one application API is visible in real time through the developer GUI interacting with the computer architecture; and
a network layer comprising said at least one femtocell and a presence event emulator, the presence event emulator being implemented as a piece of software operable to mimic one or more instances of said at least one femtocell for providing a virtual femtocell for emulating events, and
wherein the method further comprises:
testing said at least one femtocell-based application using the testing framework component and the presence event emulator.

2. The method according to claim 1, wherein the lifecycle management of the at least one femtocell-based application is supported through an administrator GUI interfaced to the execution environment of the computer architecture by an administrator API.

3. The method according to claim 1, further comprising operating the at least one application API to integrate an operator portal of the mobile operator network with the computer architecture.

4. The method according to claim 3, further comprising operating the at least one femtocell-based application to interact with the execution environment through the at least one application API.

5. A computer architecture for development and management of femtocell-based applications,
wherein the computer architecture is a software and hardware architecture implemented in a mobile operator network that includes a femtocell gateway, an application server, an application cloud and/or the Internet, and wherein the computer architecture is implemented with its own graphical user interfaces and runs as a standalone system within the mobile operator network;
wherein the computer architecture is available to mobile network operators and third parties for development and lifecycle management of at least one femtocell-based application for at least one femtocell in the mobile operator network,
wherein the computer architecture comprises:
a creation environment comprising a testing framework component including a set of testing automation tools and/or test cases for said at least one femtocell-based application, wherein development of the femtocell-based application is supported through a developer graphical user interface (GUI) interfaced to the creation environment by a developer application programming interface (API);
a network layer comprising said at least one femtocell and a presence event emulator, the presence event emulator being implemented as a piece of software operable to mimic one or more instances of said at least one femtocell for providing a virtual femtocell for emulating events; and an execution environment comprising a runtime execution environment that communicates to the at least one femtocell-based application through at least one application API, wherein the at least one application API is visible in real time through the developer GUI interacting with the computer architecture;

wherein the testing framework component and the presence event emulator are used for testing said at least one femtocell-based application.

6. The computer architecture according to claim 5, the computer architecture comprising the execution environment, wherein the lifecycle management of the at least one femtocell-based application is supported through an administrator GUI interfaced to the execution environment by an administrator API.

7. The computer architecture according to claim 5, wherein the at least one application API is operable to integrate the computer architecture with an operator portal of the mobile operator network.

8. The computer architecture according to claim 5, wherein the at least one femtocell-based application is operable to interact with the execution environment through the at least one application API.

9. A communications network for development and management of femtocell-based applications, the communications network comprising:

a mobile operator network for Internet access to a plurality of local areas in the communications network;

at least one femtocell, wherein the femtocell is plugged in into one of the local areas of the communications network and is connected to the mobile operator network; and the computer architecture according to anyone of the preceding claims.

\* \* \* \* \*